United States Patent [19]

Habiger et al.

[11] B 3,996,743

[45] Dec. 14, 1976

[54] UNDERSPEED ACTUATOR WITH PART THROTTLE CONTROL

[75] Inventors: Cyril W. Habiger; William J. Spivey, both of Joliet, Ill.

[73] Assignee: Caterpillar Tractor Co., Peoria, Ill.

[22] Filed: Feb. 20, 1975

[21] Appl. No.: 551,809

[44] Published under the second Trial Voluntary Protest Program on February 24, 1976 as document No. B 551,809.

[52] U.S. Cl. .................................. 60/431; 60/444; 60/447; 60/488; 60/486
[51] Int. Cl.$^2$ ........................................ F16H 39/46
[58] Field of Search ............ 60/431, 433, 444, 445, 60/447, 449–465, 488

[56] References Cited

UNITED STATES PATENTS

| | | | |
|---|---|---|---|
| 3,228,184 | 1/1966 | Harbidge et al. ..................... | 60/433 |
| 3,477,225 | 11/1969 | Cryder et al. ....................... | 60/433 |
| 3,528,243 | 9/1970 | Cryder et al. ..................... | 60/451 X |
| 3,785,754 | 1/1974 | Miller .............................. | 60/449 X |

Primary Examiner—Edgar W. Geoghegan
Attorney, Agent, or Firm—Phillips, Moore, Weissenberger, Lempio & Strabala

[57] ABSTRACT

A hydrostatic unit of the type contemplated by the present invention includes one or more pump and motor combinations interconnected by means of a conventional closed loop. Controls for the hydrostatic unit include a speed control and vent valve assembly as well as a venturi manifold which functions to normally establish a selected pressure differential in a pair of supply conduits for determining instant operating conditions for the transmission. In order to automatically regulate displacement of each pump unit in response to prime mover speed, an underspeed actuator valve unit includes a piston which is hydraulically responsive to the differential pressure in order to adjust operation of a lever which controls displacement of the pump unit. A part throttle control valve prevents the underspeed actuator from reducing displacement of the pump unit when speed of the prime mover is reduced by a manual throttle control.

8 Claims, 9 Drawing Figures

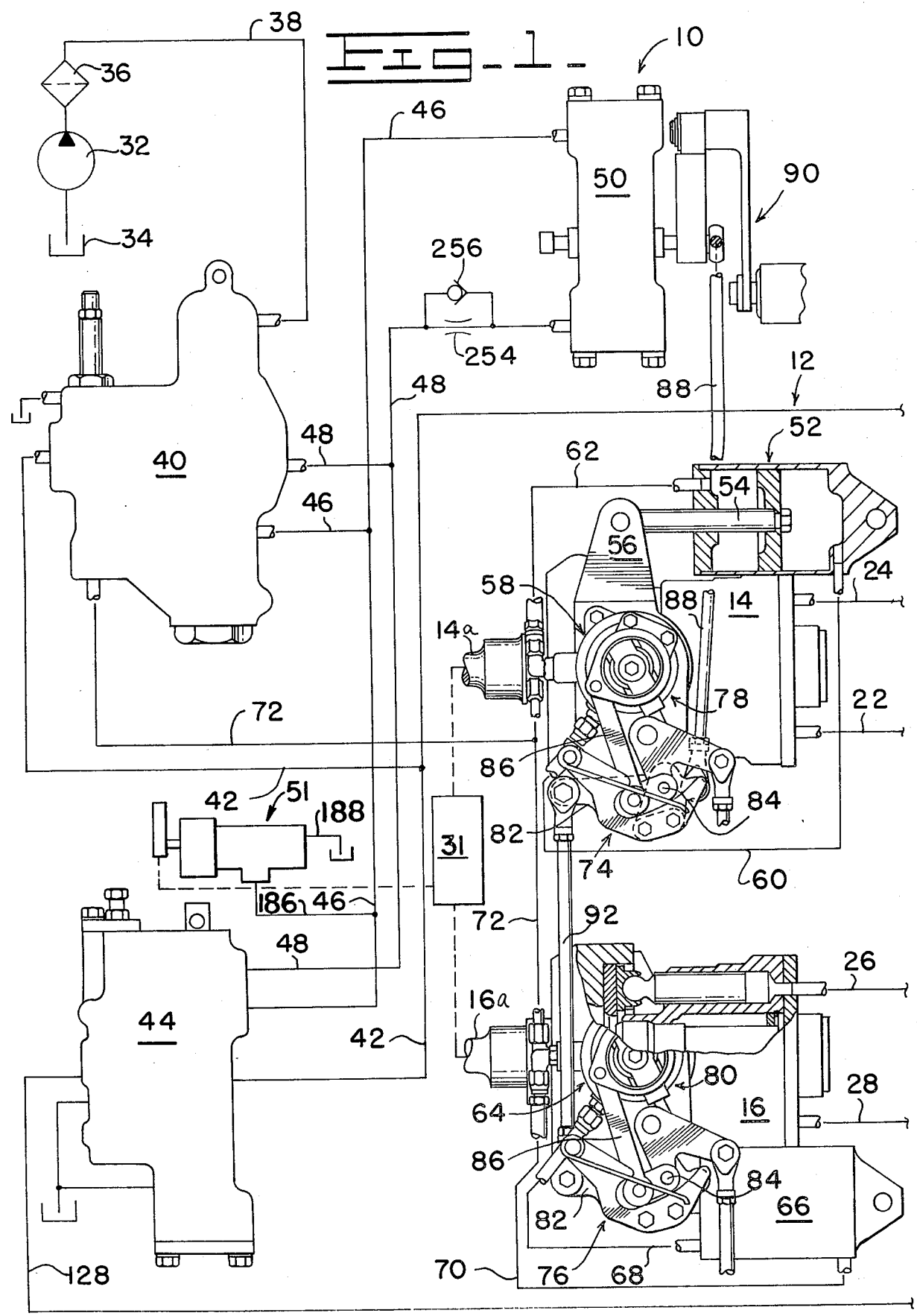

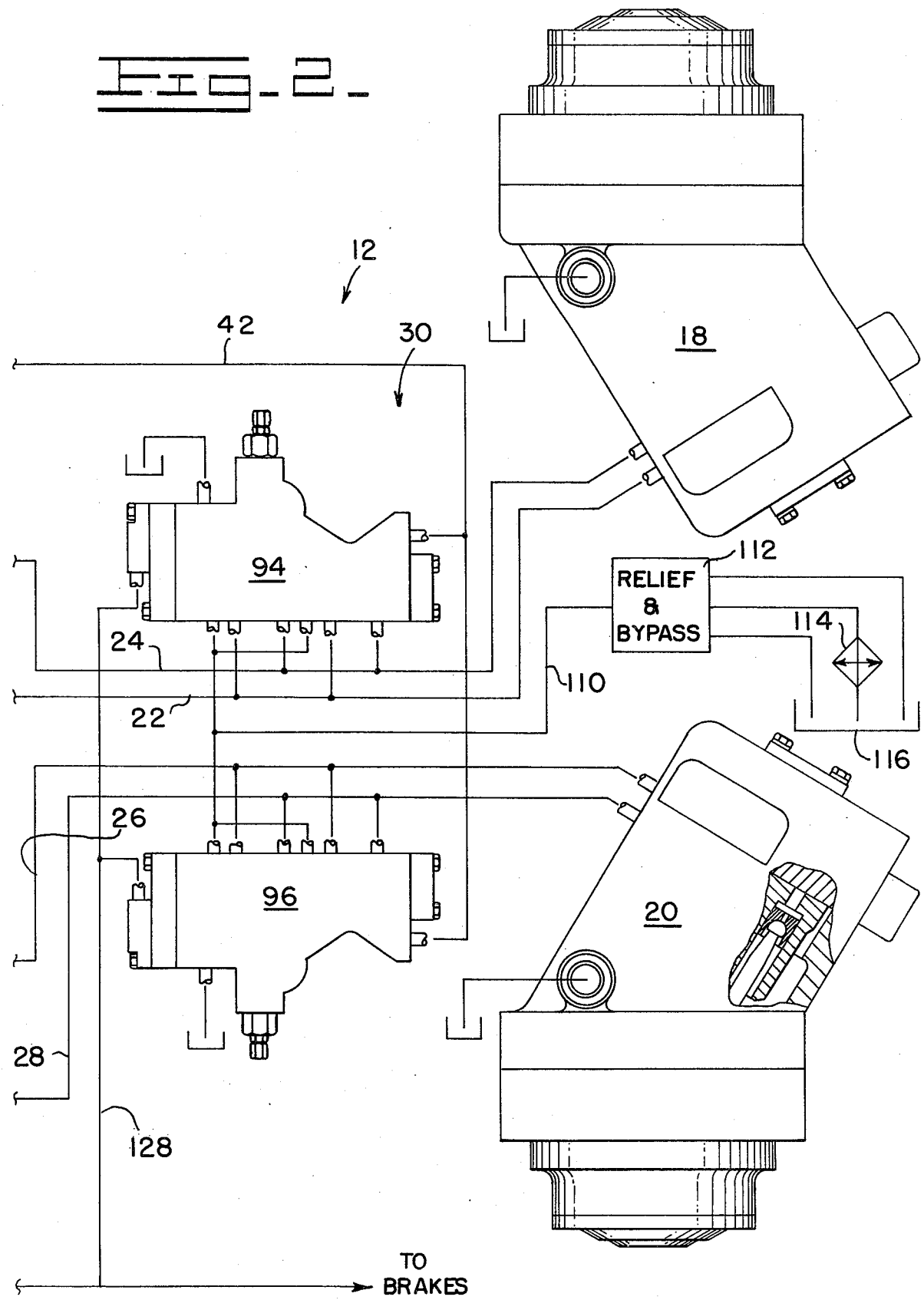

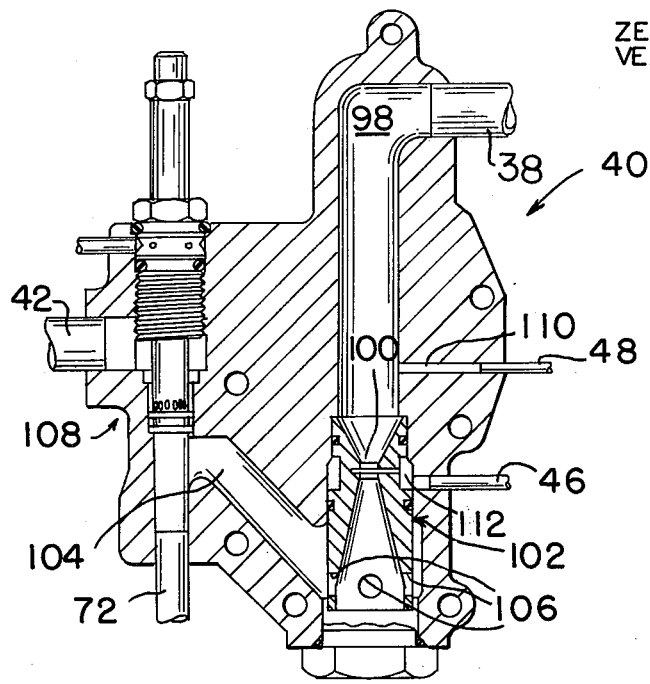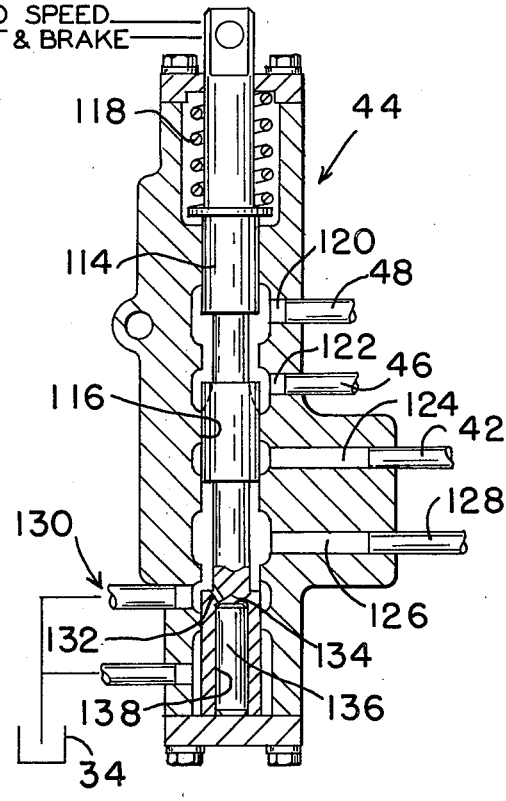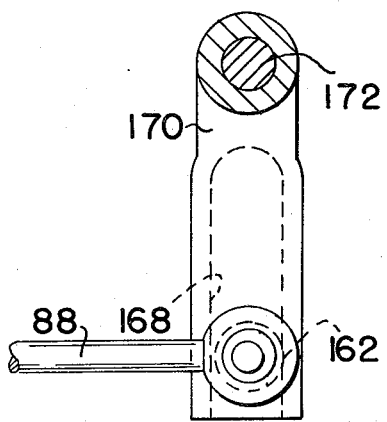

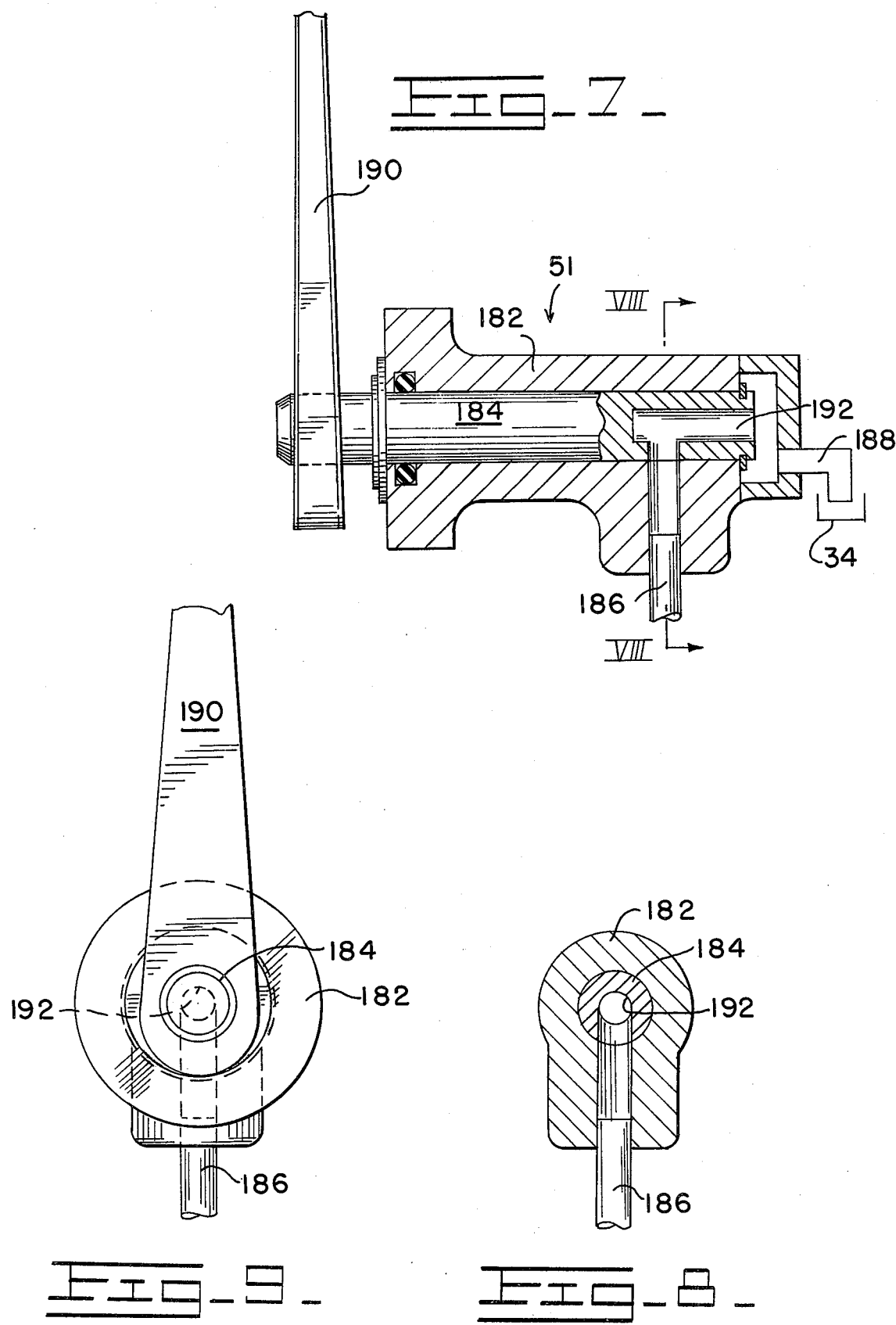

UNDERSPEED ACTUATOR WITH PART THROTTLE CONTROL

BACKGROUND OF THE INVENTION

The present invention relates to an underspeed actuator unit which is responsive to operating speed of a prime mover or engine in order to automatically adjust a variable torque transmitting coupling in a transmission driven by the prime mover. More particularly, the underspeed actuator is operable to adjust displacement of a hydrostatic pump only while the prime mover is set for full throttle operation for greater efficiency.

Hydrostatic transmissions adapted for track-type vehicles commonly include parallel pump units each having variable displacement in order to permit operator control over vehicle speed and/or direction by appropriately varying displacement of one or both pumps. The present invention is particularly described below in connection with a hydrostatic transmission of this type. However, it will be apparent from the following description that the present invention is also applicable to more conventional hydrostatic transmissions having a single pump unit or multiple pump units whose displacement is simultaneously varied.

In most hydrostatic transmissions, it is desirable to reduce the load placed upon thee prime mover by the transmission when operating speed of the prime mover falls below a selected range because of an external load, such as when a vehicle including the prime mover and transmission is operating uphill or otherwise encounters an increased load.

The use of underspeed regulator or actuator valves is known in connection with hydrostatic transmissions for overcoming this problem as may be seen by reference to U.S. Pat. No. 3,477,225 and U.S. Pat. No. 3,727,628, both of which are assigned to the Assignee of the present invention. An underspeed actuator similar to that employed by the present invention is also disclosed by a copending application entitled: UNDERSPEED ACTUATOR FOR HYDROSTATIC TRANSMISSION filed on Feb. 20, 1975, as Ser. No. 551,474, assigned to the Assignee of the present invention.

A problem commonly encountered by underspeed actuators of the type disclosed by the above-noted references is that displacement of the hydrostatic pump or pumps is automatically reduced when engine speed is deliberately cut back by manipulation of the throttle. Thus, the variable displacement pump or pumps cannot be maintained at their maximum displacement position when the engine is being operated at part throttle. The problem arises primarily in that efficiency of the hydrostatic transmission is decreased under such circumstances.

SUMMARY OF THE INVENTION

Accordingly, it is an object of the present invention to provide a simple underspeed actuator for normally adjusting the variable capacity of a transmission relative to operating speed of a prime mover while limiting operation of the underspeed actuator when the prime mover is manually set for less than full or optimum speed operation.

It is a more particular object of the invention to provide an underspeed actuator in conjunction with a hydrostatic transmission, the underspeed being responsive to operating speed of a prime mover for the transmission while being conditioned to develop increased or maximum pump displacement when the prime mover is manually set for less than full or optimum speed operation.

It is another object of the invention to provide such an underspeed actuator which is responsive to a differential pressure produced by a positive displacement pump, a venturi manifold assembly and a speed control and vent valve assembly, the speed control and vent valve assembly being manually operable to override the underspeed actuator.

Additional objects and advantages of the invention are made apparent in the following description having reference to the accompanying drawings.

BRIEF DESCRIPTION OF THE DRAWINGS

FIGS. 1 and 2 are both schematic representations, with parts illustrated in section, to provide a composite view of a control system for a pair of variable displacement pump units within a hydrostatic transmission.

FIG. 3 is a more detailed and enlarged view, in longitudinal section, of a venturi manifold unit employed within the hydrostatic transmission control system of FIGS. 1 and 2.

FIG. 4 is an enlarged view, in longitudinal section, of a speed control and vent valve unit employed within the hydrostatic control system of FIGS. 1 and 2.

FIG. 5 is a detailed view, with parts in section, of an underspeed actuator also included within the hydrostatic control system of FIGS. 1 and 2.

FIG. 6 is a view taken along section line VI—VI of FIG. 5.

FIG. 7 is an enlarged view of a part throttle control valve included within the hydrostatic control system of FIGS. 1 and 2.

FIG. 8 is a view taken along section line VIII—VIII of FIG. 7.

FIG. 9 is a view of the part throttle control valve taken from the left end of FIG. 7.

DESCRIPTION OF THE PREFERRED EMBODIMENTS

As indicated above, the present invention relates particularly to a control system for a variable capacity transmission, an underspeed actuator being responsive to operating speed of a prime mover coupled with the transmission input. The invention is particularly directed toward a hydrostatic transmission and control circuit as illustrated by composite FIGS. 1 and 2.

THE CONTROL CIRCUIT OF FIGS. 1 AND 2

Referring now to FIGS. 1 and 2, a hydrostatic control circuit is generally indicated at 10 for association with a hydrostatic transmission 12 including two variable displacement, over-center pump units 14 and 16 and two fixed displacement motor units 18 and 20. The first pump unit 14 is in communication with the motor unit 18 by means of a closed hydrostatic loop including conduits 22 and 24. The second pump unit 16 is similarly in communication with the motor unit 20 by means of a closed hydrostatic loop including two conduits 26 and 28.

A replenishing and relief valve assembly 30 is interconnected with both pairs of hydrostatic conduits 22, 24 and 26, 28. The replenishing and relief valve assembly 30 functions in a generally conventional fashion in order to replace hydraulic fluid lost from the pump and motor combinations due to leakage and to relieve excessive hydraulic pressure developed within the pump units, the motor units and the interconnecting hydrostatic loops.

Each of the pump units 14 and 16 includes an input shaft 14a or 16a for coupling with a conventional prime mover or engine schematically indicated at 31.

A fluid supply for both the hydrostatic control circuit 10 as well as the replenishing and relief valve assembly 30 is provided by a positive displacement pump 32 conventionally driven by the prime mover for the transmission 12. The pump 32 draws hydraulic fluid from a reservoir or sump 34 and delivers fluid under pressure through a filter 36 into an inlet conduit 38 for a venturi manifold unit 40. The venturi manifold unit 40 supplies makeup fluid to the replenishing and relief valve assembly 30 through a branched conduit 42.

A speed control and vent valve 44 is also interconnected with the branched line 42 and further communicates with the venturi manifold 40 by means of a pair of branched conduits 46 and 48.

An underspeed actuator unit 50 is in communication with both the venturi manifold unit 40 and the speed control and vent valve assembly 44 by means of the branched lines 46 and 48. Construction and operational features for the underspeed actuator 50 and an associated part throttle control valve 51 as well as the venturi manifold 40 and speed control valve 44 are described in greater detail below.

The pump unit 14 includes a double-acting fluid actuator 52 having an extendable rod 54 coupled with a swash plate 56 for controlling fluid output from the pump through the conduits 22, 24.

The pump unit 14 includes a rotary servo valve 58 which is connected to the head end and rod end respectively of the actuator 52 by means of conduits 60 and 62. Similarly, a servo valve 64 for the pump 16 is connected to the rod end and head end of another actuator 66 by conduits 68 and 70. Both rotary valves 58 and 64 are of a conventional type having a valve spool (not shown) which is rotatable therein for controlling fluid flow to the actuators 52 and 66. The spools may be rotated in either clockwise or counterclockwise fashion in order to extend or retract the respective actuators 52 and 66. This results in either clockwise or counterclockwise rotation of the swash plates to establish the direction of rotation of the respective motors 18 and 20. Actuating fluid for the servo valves 58 and 64 is supplied through a branched conduit 72 which is also in communication with the venturi manifold 40.

Each of the pumps 14 and 16 includes a control linkage arrangement 74 or 76 for positioning the valve spool of the respective servo valves 58 and 64 through separate null and gain adjuster mechanisms generally indicated at 78 and 80, respectively. Construction and operation of a control linkage of the type indicated at 74 or 76 is described in greater detail within a copending U.S. Patent application entitled: CONTROL LINKAGE FOR HYDROSTATIC TRANSMISSIONS, filed on Dec. 9, 1974, as Ser. No. 530,924. Similarly, a null and gain adjuster mechanism of the type indicated at 78 or 80 is also more completely described within a copending patent application entitled: NULL AND GAIN ADJUSTMENT MECHANISM FOR HYDROSTATIC PUMPS AND MOTORS, filed on Jan. 9, 1974, as Ser. No. 530,926. Both of these inventions are assigned to the Assignee of the present invention.

These elements are summarized below at least sufficiently to explain the present invention. Generally, each of the pumps 14 and 16 includes a control lever 82 which may be rotated in clockwise fashion (as seen in FIG. 1) about a pivot point 84 which causes a link 86 to rotate the respective null and gain adjuster mechanisms 78 and 80 in a clockwise direction along with the valve spool for each rotary servo valve 58 and 64. Counterclockwise rotation of the levers 82 similarly results in counterclockwise rotation of the valve spools. The lever 82 for pump 14 is manually controlled by a link 88 which is pivotably connected at one end to the lever 82, the other end of the link 88 being pivotably connected to a manually operable lever arrangement 90 which is associated with the underspeed actuator 50. An additional link 92 is interconnected between the levers 82 for the pumps 14 and 16 so that the valve spools for both rotary servo valves 58 and 64 are operated in unison. The control linkage arrangement described immediately above is resiliently urged toward a neutral position shown in FIG. 1, for example, by means of a conventional centering spring mechanism (not shown).

THE REPLENISHING AND RELIEF VALVE ASSEMBLY

Operation of the replenishing and relief valve assembly 30 is not an essential portion of the present invention, its construction and operation being described in detail by U.S. Pat. No. 3,528,243, having particular reference to FIG. 8 of that patent. The replenishing and relief assembly 30 (see FIG. 2) includes a pair of similar valves indicated respectively at 94 and 96. The replenishing and relief valve 94 is in communication with conduits 22 and 24, the other replenishing and relief valve being in communication with the conduits 26 and 28.

THE VENTURI MANIFOLD

The venturi manifold 40 is illustrated in greater detail within FIG. 3 and includes an inlet passage 98 for recieving fluid from the pump 32 through the conduit 38. Fluid is directed by the passage 98 through a venturi throat 100 in a venturi assembly 102 and then into a passage 104 through a plurality of radially formed ports 106. The passage 104 is in branched communication with the conduit 72 (also see FIG. 1) and a relief valve 108 which maintains a predetermined pressure within the passage 104 and conduit 72, excess fluid being returned by the relief valve to the conduit 42.

A high pressure port 110 interconnects the venturi inlet passage 98 with the conduit 48 which is also in communication both with one end of the underspeed actuator 50 and with the speed control and vent valve 44 (see FIG. 1). A low pressure port 112 adjacent the venturi throat 100 is in communication with the conduit 46. As may be seen from FIG. 1, the conduit 46 is also in communication with the opposite end of the underspeed actuator 50 and the speed control and vent valve 44.

Fluid pressure within the high pressure and low pressure ports 110 and 112 is responsive to the rate of fluid flow through the venturi throat 100 and generally proportional to the operating speed of the pump 32 as well as the prime mover (not shown) by which the pump is driven. Accordingly, increasing or decreasing prime mover speed results in a corresponding change in the output of the pump 32. The ports 110 and 112 thereby tend to adjust the pressure differential between the conduits 46 and 48 for a purpose described in greater detail below.

SPEED OVERRIDE AND VENT VALVE

The speed override and vent valve 44 illustrated in FIG. 4 includes a spool 114 arranged within a bore 116 and urged toward the position illustrated in FIG. 4 by means of a spring 118. With the spool 114 in the position illustrated, communication is established between ports 120 and 122 which are respectively connected to conduits 48 and 46. Accordingly, fluid pressure in the conduits 46 and 48 is equalized in order to override or prevent the underspeed actuator 50 from performing its normal function of varying pump displacement as described below.

Simultaneously, communication is blocked between ports 124 and 126 which are respectively connected to supply conduit 42 and a conduit 128, the conduit 128 also being placed in communication with a drain port 130. With the conduit 128 thereby being vented, the loop conduits between each pump and motor combination, as indicated at 22, 24 and 26, 28 in FIGS. 1 and 2, are placed in communication with each other by means of the replenishing and relief valves 94 and 96. This results in application of a spring-applied, pressure-released parking brake (not shown).

Manual actuation of the spool 114 toward its ZERO SPEED position blocks fluid flow through the drain port 130 and interconnects the supply conduit 42 with the conduit 128. Accordingly, the conduit 128 again supplies fluid under pressure to the replenishing and relief valves in order to release the parking brakes and again permit a pressure differential to be developed within each set of conduits 22, 24 and 26, 28.

Simultaneously, increasing pressure in the conduit 128 is communicated through an internal passage 132 in the spool 114 to a chamber 134. The chamber 134 is formed by a reaction slug 136 slidably disposed in a bore 138 formed by the lower end of the spool 114. Pressure within the chamber 134 acts against the bias of the spring 118 so that the spool 114 is rapidly returned to its MAXIMUM SPEED position when manual restraint over the movement of the spool 114 is removed.

With the spool 114 in its MAXIMUM SPEED position, communication between the conduits 46 and 48 is blocked with the underspeed actuator 50 functioning in its automatic mode for controlling vehicle speed in response to the fluid pressure differential existing between the conduits 46 and 48 as described above.

Manual control over transmission and vehicle speed is normally maintained by precise positioning of the lever arrangement 90 (see FIGS. 1 and 5). Such manual control could also be maintained, for example, by means of a simple and conventional speed control valve (not shown). In either case, the speed override and vent valve 44 permits an operator to manually adjust the spool 114 between MAXIMUM and ZERO SPEED positions with fluid under pressure being relieved from the high pressure conduit 48 into the other conduit 46 in order to adjust the pressure differential existing in those conduits. Upon occurrence of a malfunction within the control circuit, such as the absence of fluid pressure in the supply conduit 42 when the engine is shut down, the spring 118 returns the spool 114 to its illustrated position and applies the parking brakes described above as well as terminating operation of the transmission 12 (see FIGS. 1 and 2).

UNDERSPEED ACTUATOR AND PART THROTTLE CONTROL VALVE

As noted above, the underspeed actuator 50, generally illustrated within the hydraulic control circuit of FIG. 1 and more specifically illustrated in FIG. 5, responds to the fluid pressure differential existing in the conduits 46 and 48. That differential pressure, as indicated above, is generally proportional to operating speed of the pump 32 and the input shafts 14a and 16a of the respective hydrostatic pumps.

Referring now particularly to FIG. 5, the underspeed actuator 50 includes a valve body 140 forming a bore 142 for receiving an elongated tubular piston 144. The valve body 140 is also formed with diametrically opposed, elongated apertures 146 extending along a central portion of the bore 142. The tubular piston 144 is closed at its lower end 148 with counterbores 150 and 152 being formed at the lower and upper ends of the bore 142 respectively. The piston 144 is resiliently urged downwardly by a spring 154. The counterbores 150 and 152 arranged at opposite ends of the bore 142 are in respective fluid communication with the conduits 48 and 46.

An annular split collar 156 encompasses a central portion of the piston 144 and has projections 158 which extend into the elongated apertures 146. Two rollers 160 and 162 are mounted on the projections 158. The roller 160 is disposed within a guide slot 164 formed by a member 166 which is suitably secured to the valve body 140. Similarly, the other roller 162 is disposed within an elongated groove or slot 168 formed on one side of an element 170 of the lever arrangement 90 (also see FIGS. 1 and 5). The lever element 170 is pivotably connected by means of a pin 172 to an actuating lever 174. The link 88 described above with reference to FIG. 1 is pivotably secured to the opposite side of the lever element 170 at its lower end by means of a pin 176. The lever 174 is secured for rotation with a shaft 178 having a journalled support 180. The shaft 178 may thus be suitably secured to a conventional operator control element (not shown) for controlling pump displacement.

The interconnection of the underspeed actuator 50 with the conduits 46 and 48, as described above, permits it to respond to input speed of the transmission 12.

The part throttle control valve 51 is connected with the underspeed actuator 50 and functions in response to manual deceleration of the prime mover 31 to condition the underspeed actuator 50 for establishing relatively increased displacement of the pumps 14 and 16.

As may be better seen in FIGS. 7–9, the part throttle control valve 51 comprises a rotary valve body 182 having a rotatable valve spool 184. The valve 51 is in communication with the conduit 46 through a branch conduit 186 and with the common sump 34 through a drain conduit 188.

A lever 190 is secured to an extended end of the rotatable spool 184 while also being coupled to the throttle control linkage of the prime mover 31 (see FIG. 1). With the lever 190 and the spool 184 in the illustrated position, an internal passage 192 formed in the spool 184 communicates the conduit 186 with the drain conduit 188. The illustrated position of the lever 190 and spool 184 correspond to a part throttle setting for the prime mover 31.

Normally, the prime mover 31 is conditioned for full or optimum speed operation which results in rotation of the lever 190 and spool 184 to a position blocking communication between the conduit 186 and drain conduit 188. The underspeed actuator 50 then functions only in response to the differential pressure established in the conduits 46 and 48 by the venturi manifold 40 in response to operating speed of the pump 32.

MODE OF OPERATION

Forward travel of a vehicle including the transmission 12 is initiated by rotating the shaft 178 and lever 174 in counterclockwise fashion (as viewed from the right side of FIG. 5) toward a preselected maximum position while reversed travel may be initiated by similarly rotating the shaft and lever in a clockwise direction. The roller 162 provides a movable pivot point for the lever 170 (see FIG. 6). Thus, the position of the piston 144 within its bore 142 determines the amount of linear motion imparted to the link 88 in response to rotation of the shaft 178 and lever 174. As indicated above, the link 88 is operatively connected to the servo valve 58 through the control linkage described above with specific reference to FIG. 1. In this manner, the link 88 establishes the amount of displacement for both pumps 14 and 16 in order to determine the rate of operation for the motors 18 and 20.

With the piston 144 in the position illustrated in FIG. 5, the roller 162 and pivot point for the lever 170 are in axial alignment so that movement of the link 88 cannot be affected upon rotation of the shaft 178 and lever 174. This position of the piston and condition of the underspeed actuator is commonly referred to as "FULL UNDERSPEED."

In contrast, when the piston 144 is shifted upwardly toward the upper end of its bore 142, the roller 164 also moves upwardly along the groove 168 in the lever 170 in order to change the effective moment arm of the lever. Accordingly, the link 88 experiences increased linear travel, reaching a maximum when the piston 144 is shifted completely upwardly within its bore 142. This position provides for relatively maximum displacement of the pumps 14 and 16 as well as maximum operating speed of the transmission and its vehicle, commonly referred to as "ZERO UNDERSPEED." Accordingly, it may be seen that vehicle speed can be controlled by adjusting the position of the piston 144 within the bore 142.

The piston 144 is positioned within its bore in response to the actual pressure differential existing between conduits 46 and 48 as well as force of the spring 154. The pressure differential across the conduits 46 and 48 is regulated either manually by manipulation of the valve spool 114 in the speed control valve (see FIG. 4) or automatically by means of the venturi manifold 40 (see FIG. 3) in response to operating speed of the positive displacement pump 32 at least when the valve spool 114 is in its MAXIMUM SPEED position.

When the transmission input shafts 14a and 16a are being driven at rated or optimum speed by a prime mover, fluid output of the positive pump 32 is substantially constant. Fluid flow across the venturi throat 100 (see FIG. 3) creates a pressure differential between ports 110 and 112 which is communicated into the respective conduits 48 and 46. With the valve spool 114 (see FIG. 4) in its MAXIMUM SPEED position, blocking communication between the conduits 48 and 46, the higher fluid pressure in the conduit 48 and the counterbore 150 of the underspeed actuator 50 is sufficient to overcome the spring 154, thus shifting the piston 144 upwardly toward its ZERO UNDERSPEED position.

However, as the transmission or vehicle encounters an increased load or increased resistance to movement which causes lugging of the prime mover, operating speed of the positive displacement pump 32 decreases with a resultant decrease of fluid flow through the venturi throat 100. Pressure is thus relatively increased in the outlet port 112 and the conduit 46. Increased pressure is also thereby developed in the upper end of the bore 142 of the underspeed actuator. This increased pressure cooperates with the spring 154 to urge the piston 144 downwardly generally in proportion to the amount of pressure increase within the conduit 46. Accordingly, the displacement of the pumps 14 and 16 is decreased, thereby reducing torque requirements for their input shafts 14a and 16a, until the torque requirements of the pumps equal the torque output of the engine at its instantaneous reduced speed. Should the increased resistance remain constant for a period of time, the position of the piston 144 will remain balanced intermediate the ZERO UNDERSPEED and FULL UNDERSPEED positions.

When the increased load is relieved, the prime mover of the transmission is permitted to regain its rated operating speed with the pump 32 also returning to its normal operating speed. At the same time, normal fluid flow through the venturi throat 100 reestablishes the original pressure differential in the conduits 46 and 48 so that the piston 144 is again shifted upwardly toward the ZERO UNDERSPEED position.

As indicated above, manual control over the piston 144 is accomplished by manipulation of the valve spool 114 in the speed control valve 44 which adjusts or eliminates the pressure differential between the conduits 46 and 48. For example, increased fluid pressure in the conduit 46 cooperates with the spring 154 to shift the piston 144 downwardly in order to decrease operating speed of the transmission and its vehicle. As fluid pressure within the conduits 46 and 48 approaches equilibrium, the spring 154 shifts the piston 144 downwardly to its FULL UNDERSPEED condition where the output displacement of the pumps 14 and 16 is reduced with an equivalent reduction in the operating speed of the transmission.

When the throttle control linkage for the prime mover 31 is positioned to obtain rated engine speed, the lever 190 and shaft 184 are rotated from the position illustrated in FIG. 7 to block communication between conduit 186 and drain conduit 188. Thus, the underspeed actuator 50 functions in the manner described above. However, positioning the throttle control linkage to obtain a lower engine speed results in the lever 190 being rotated to the position illustrated in FIG. 7 to establish communication between the conduits 186 and 188, thereby venting conduit 46 to the sump 34. This creates a reduced pressure in conduit 46 which may be seen as a "false" underspeed signal, the pressurized fluid in conduit 48 causing the underspeed actuator 50 to establish maximum displacement of the pumps 14 and 16. This condition is desirable, for example, when the vehicle is traveling under low loads. Fuel consumption is also thereby reduced under low load conditions which commonly prevail when the prime mover operating speed is manually reduced.

We claim:
1. A control system for regulating displacement of a pump unit in a hydrostatic transmission including input means coupled with a prime mover having a variable throttle setting and output means, the control system having a pump means driven in conjunction with the transmission input means to produce output fluid flow proportional to the operating speed of the transmission input means, and comprising control means coupled with the pump unit for selectively adjusting its displacement, a hydraulically responsive underspeed actuator operatively coupled with the control means in order to vary the amount of actual change in pump displacement relative to movement of the control means, and signal means for receiving output fluid flow from the pump means and communicating a variable fluid signal to which the underspeed actuator is responsive, and part throttle control means coupled with the prime mover and responsive to a reduced throttle setting for the prime mover to condition the underspeed actuator for maintaining an increased displacement setting of the pump means and thereby establishing more efficient transmission operation.

2. The control system of claim 1 further comprising a speed control valve in effective communication with the underspeed actuator, the speed control valve including a manual override control element for selectively adjusting the variable fluid signal and the response of the underspeed actuator independently from the part throttle control means.

3. A control system for regulating displacement of a pump unit in a hydrostatic transmission also including input means and output means, the input means being coupled with a prime mover having a normal throttle setting, comprising signal means being operable with the transmission input means to produce an output signal proportional to the operating speed of the transmission input means, control means coupled with the pump unit for adjusting its displacement, an underspeed actuator operatively coupled with the control means in order to vary the amount of acutal change in pump displacement relative to movement of the control means, signal transmitting means for receiving the output signal from the proportional signal means and communicating a variable signal to which the underspeed actuator is responsive, and a part throttle control means coupled with the prime mover and the underspeed actuator, the part throttle control means being responsive to a reduced throttle setting relative to the normal setting of the prime mover for conditioning the underspeed actuator to maintain an increased displacement setting of the pump means and thereby achieve more efficient transmission operation.

4. The control system of claim 3 further comprising a speed control means including a manual override control element for selectively adjusting response of the underspeed actuator to the variable signal independently from the part throttle control means.

5. The control system of claim 4 wherein the underspeed actuator is hydraulically responsive, the part throttle control means comprising a valve having a spool operatively coupled to the prime mover throttle control, movement of the spool by the prime mover throttle control hydraulically biasing the underspeed actuator and conditioning it to maintain an increased displacement setting for the pump means.

6. A control system for a transmission including input means, output means, and means for adjusting torque transmitting capacity of the transmission, the input means being coupled with a prime mover having a normal throttle setting, comprising signal means being operable with the transmission input means to produce an output signal proportional to the operating speed of the transmission input means, control means coupled with the means for adjusting torque transmitting capacity, an underspeed actuator operatively coupled with the control means in order to vary the amount of actual change in torque transmitting capacity relative to movement of the control means, and signal transmitting means for receiving the output signal from the proportional signal means and communicating a variable signal to which the underspeed actuator is responsive, and a part throttle control means coupled with the prime mover and responsive to a reduced throttle setting for the prime mover in order to condition the underspeed actuator for maintaining reduced torque transmitting capacity in the adjustable torque transmitting means and thereby achieving more efficient transmission operation.

7. The control system of claim 6 further comprising a speed control means including a manual override control element for selectively adjusting response of the underspeed actuator to the variable signal independently of the part throttle control means.

8. A combined hydrostatic transmission and control system, the hydrostatic transmission including a pump unit driven by a transmission input means coupled with a prime mover having a normal throttle setting and a motor unit coupled with the pump unit by a closed hydrostatic loop and coupled with a transmission output means, the pump unit including a movable control means for adjusting its displacement, the control system comprising a pump means driven with the transmission input means to produce output fluid flow proportional to operating speed of the transmission input means, a venturi unit for receiving output flow from the pump means and developing a differential pressure in a pair of conduits, a speed control valve also being in communication with the two conduits and including a manual override control element for selectively intercommunicating the two conduits, a lever mechanism coupled with the movable control means for the pump unit, the lever mechanism being movable for selectively adjusting displacement of the pump unit, a hydraulically responsive underspeed actuator including a valve body forming a bore, a piston means being slidably disposed within the bore and providing a movable pivot point for the lever means, the two conduits being in communication with the bore on opposite ends of the piston in order to position the piston and adjust the pivot point for the lever mechanism relative to operating speed of the pump means and transmission input means, and a part throttle control valve operatively coupled with the prime mover and responsive to reduction of the prime mover throttle setting for varying fluid pressure in one of the conduits in order to condition the underspeed actuator for maintaining an increased displacement setting for the pump unit.

\* \* \* \* \*